United States Patent
Cruickshank

[11] Patent Number: 5,218,819
[45] Date of Patent: Jun. 15, 1993

[54] EXHAUST SYSTEM FOR AN INTERNAL COMBUSTION ENGINE

[75] Inventor: Ronald W. Cruickshank, Chicago, Ill.

[73] Assignee: Bulga Ash Pty. Ltd., Inverloch, Australia

[21] Appl. No.: 738,131

[22] Filed: Jul. 30, 1991

[51] Int. Cl.⁵ .............................................. F02B 27/02
[52] U.S. Cl. ..................................................... 60/314
[58] Field of Search ......................... 60/312, 314, 274

[56] References Cited

U.S. PATENT DOCUMENTS 2,102,559 12/1937 Kadenacy .............................. 60/314
3,254,484 6/1986 Kopper et al. .
3,434,280 11/1967 Burkhart .
3,703,937 11/1972 Tenney .
3,726,092 4/1973 Raczuk .
4,226,298 10/1980 Bancel et al. .
4,941,319 7/1990 Yamamoto ............................ 60/314

Primary Examiner—Douglas Hart

[57] ABSTRACT

An exhaust system for a two-cycle internal combustion engine provides for maximum efficiency of the engine by displacing the baffle member to vary the effective volume of baffle chamber. Additionally, a method is provided for producing maximum engine power over a wide range of engine speeds by returning high amplitude pulses to the exhaust port at the correct timing for various speeds.

12 Claims, 4 Drawing Sheets

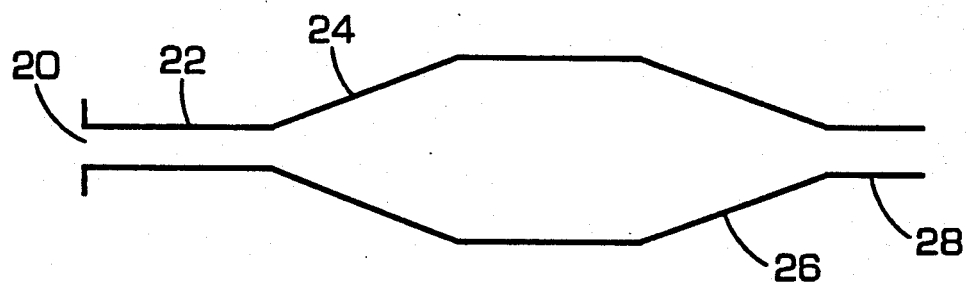
FIG.1 - Prior Art
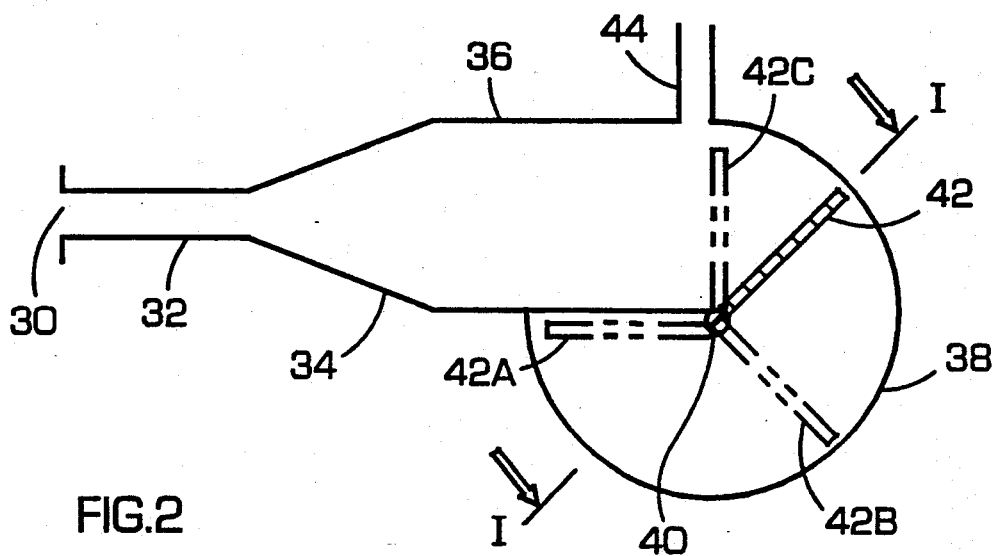
FIG.2
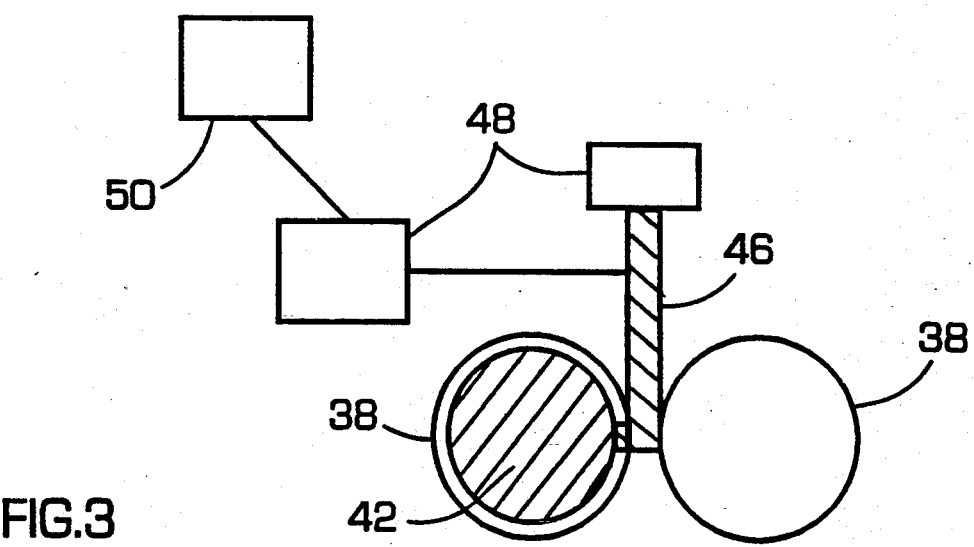
FIG.3

EXHAUST SYSTEM FOR AN INTERNAL COMBUSTION ENGINE

FIELD OF THE INVENTION

The present invention relates to an exhaust system for controlling a two-cycle internal combustion engine.

BACKGROUND OF THE INVENTION

In high-performance two-stroke engines, it is known to provide expansion chamber exhaust systems. Such exhaust systems can include an exhaust port, a header section connected to the exhaust port, a divergent section connected to the header section, and a convergent baffle section. When the exhaust port is opened, a high pressure pulse travels through the header section and the divergent section. When the pulse reaches the convergent baffle section, it is reflected back toward the exhaust port. Such systems also include a tail pipe, from which the exhaust is delivered from the exhaust pipe to the atmosphere.

In expansion chamber exhaust systems, at a given engine speed, the arrival time of a reflected pulse at the exhaust port, relative to the phase of the combustion cycle of the engine, has a substantial effect on engine performance. The travel time of the reflected pulse is determined by the distance from the exhaust port to the convergent baffle section, or the "tuned length", and is designed to match one predetermined engine speed. However, at high engine speeds, the required tuned length is shorter than the required tuned length at low engine speeds.

Further, it is know to extend the range of engine speed over which useful power is developed by constructing the convergent baffle section with an elongated profile, resulting in reflected pulses of a longer duration. However, such pulses have a lower amplitude, and thus, a lower maximum engine power.

SUMMARY OF THE INVENTION

It is an object of the present invention to provide an exhaust system for a two-cycle internal combustion engine that produces maximum engine power over a wide range of engine speeds by returning high amplitude pulses to the exhaust port with the appropriate timing for various engine speeds. Additionally, it is an object of the present invention to provide, in an exhaust system for a two-cycle internal combustion engine, a method for producing maximum engine power over a wide range of engine speeds.

These and other objects are inventively achieved by providing an exhaust system for controlling a two-cycle internal combustion engine including an exhaust port; an exhaust pipe connected to the exhaust port, a baffle chamber connected to the exhaust pipe; a displaceable baffle member, reflecting baffle member, or baffle plate, disposed in the baffle chamber, for varying the effective volume of the baffle chamber; a rotating mechanism, connected to the displaceable baffle member, for displacing the displaceable baffle member; a control circuit, connected to the rotating mechanism; for driving the rotating mechanism, and a tail pipe connected to the exhaust pipe.

The present invention also provides a method for producing maximum engine power over a wide range of engine speeds by returning high amplitude pulses to an exhaust port with the appropriate timing for various engine speeds. The method includes the steps of providing an exhaust pipe connected to the exhaust port; providing a baffle chamber connected to the exhaust pipe; providing a displaceable baffle member, disposed in the baffle chamber, for varying the effective volume of the baffle chamber; providing a rotating mechanism, connected to the displaceable baffle member, for displacing the displaceable baffle member; providing a control circuit, connected to the rotating mechanism, for driving the rotating mechanism; providing a tail pipe connected to the exhaust pipe; and actuating the rotating mechanism by means of the control circuit to displace the displaceable baffle member, thereby varying the effective volume of the baffle chamber during operation of the engine.

Thus, by dynamically varying the distance of the baffle member from the exhaust port, and thus varying the effective volume of the baffle chamber, the travel time of the exhaust pulse is varied in response to changes in engine speed.

In an embodiment of the present invention, a cross-section of the baffle chamber is of a corresponding shape, such as, for example, a circular, rectangular, oval, conical, v-shaped, or other suitable shape. Likewise, the baffle member of the present invention is of a suitable shape, such as, for example, a circular, rectangular, oval, conical, v-shaped, or other suitable shape.

In an exemplary embodiment of the present invention the baffle chamber is arced, or substantially arced, to provide for rotation of the baffle member within the baffle chamber. At least a portion of the tail pipe precedes the baffle chamber. The baffle chamber is disposed within the exhaust pipe and defines a plurality of interior walls, and the baffle member, which in its simplest form may be a plate, is disposed in close proximity to the interior walls. A suitable rotating mechanism, such as a servo motor, solenoid, pneumatic diaphragm, or centrifugal governor is chosen. An exhaust control device is connected to the control system.

In yet another embodiment of the present invention an extension chamber is connected to the baffle chamber.

In a further embodiment of the present invention the rotating mechanism is suitably connected to the rotation transmitting shaft. For example, the rotating mechanism can be connected to the rotation transmitting shaft by a cable, linkage, pulley, or pressure line, or combination of such connecting arrangements. It is also contemplated that the rotation transmitting shaft can be directly connected to, or be a part of, the rotating mechanism.

BRIEF DESCRIPTION OF THE DRAWINGS

FIG. 1 illustrates a known expansion chamber exhaust system.

FIG. 2 illustrates a cross-sectional view of the variable exhaust system of the present invention.

FIG. 3 illustrates a sectional view taken along the line I—I of FIG. 2.

DETAILED DESCRIPTION OF THE PRESENTLY PREFERRED EMBODIMENTS

Figure 4:
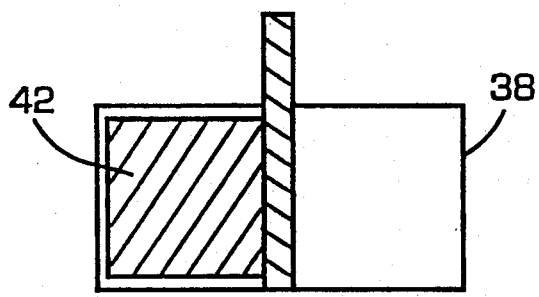
FIG. 4 illustrates a cross-sectional view of a baffle chamber having a rectangular cross-section.

As illustrated in FIG. 1, the known expansion chamber exhaust system includes an exhaust port 20, a header section 22 connected to the exhaust port 20, a divergent section 24 connected to the header section 22, a convergent baffle section 26 connected to the divergent section 24, and a tail pipe 28 connected to the convergent baffle section 26. When the exhaust port 20 is opened, a high pressure exhaust pulse travels through the header section 22 and divergent section 24. When the high pressure exhaust pulse reaches the convergent section 26, it is reflected back toward the exhaust port. The exhaust is delivered from the exhaust system to the atmosphere by the tail pipe 28.

As illustrated in FIG. 2, the exhaust system of the present invention includes an exhaust port 30, a header section 32, a divergent section 34, a middle section 36, a baffle chamber 38, a pivot point 40, a baffle member means 42, and a tail pipe 44.

It is further contemplated that a rotating shaft 46, as illustrated in FIG. 3, is connected to the baffle member 42, a rotating mechanism 48, and a control circuit 50. When a variation in engine speed is detected, the control circuit 50 activates the rotating mechanism 48 which rotates the shaft 46 and swings the baffle member 42. By swinging the baffle member 42 of the present invention about the axis of rotation or pivot point 40, the effective volume of the baffle chamber 38 is varied.

Referring to FIG. 2, the exhaust system of the present invention is designed such that at low engine speeds the baffle plate 42 is in position 42a, and as the engine speed increases, the baffle plate is rotated about pivot point 40 through position 42b. The baffle member continues to rotate as engine speed continues to increase, and reaches the position 42c at high engine speed. By the rotation of the baffle member 42, the distance from the exhaust port 30 to the reflecting baffle member 42 is varied at various engine speeds.

The rotating mechanism 48 can be an electrical servo motor, solenoid, pneumatic diaphragm, or other similar mechanism for rotating the baffle member 42. The rotating mechanism may operate directly on the baffle member, or remotely by means of, for example, cables, pulley means, pressure line means, and linkages. The control circuit 50 and rotating mechanism 48 may be replaced with a centrifugal governor or fluid pressure-type mechanism.

Figure 5:
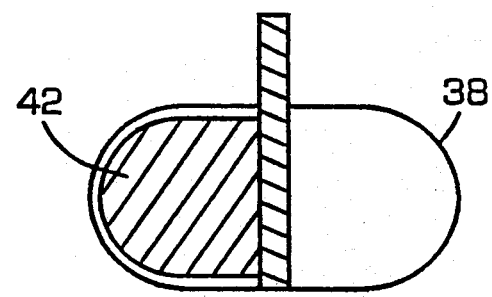
FIG. 5 illustrates a cross-sectional view of a baffle chamber having an oval cross-section.

As illustrated in FIGS. 4 and 5, the baffle chamber 38 may be constructed with a non-circular cross-section. For example, in the embodiment of FIG. 4, a baffle chamber 38 and a baffle member 42, both having a rectangular cross-section are illustrated. FIG. 5 illustrates a baffle chamber 38 and a baffle member 42, both having an oval cross-section. The shape of that portion of the baffle member which follows along the wall of the baffle chamber should be generally complementary to the cross section of the baffle chamber.

Figure 6:
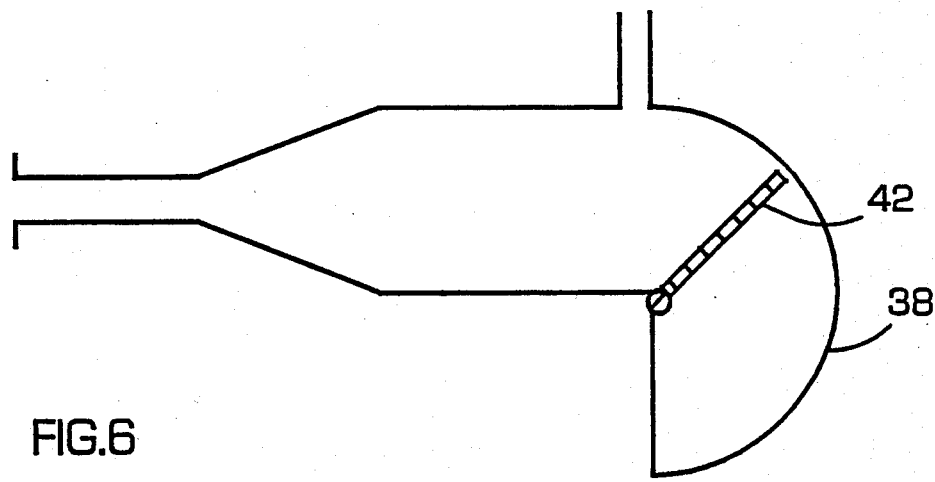
FIG. 6 illustrates as exemplary a cross-sectional view of an embodiment of the exhaust system of the present invention.

In another embodiment of the present invention, as illustrated in FIG. 6, the baffle chamber 38 has a smaller area than illustrated in FIG. 2.

Figure 7:
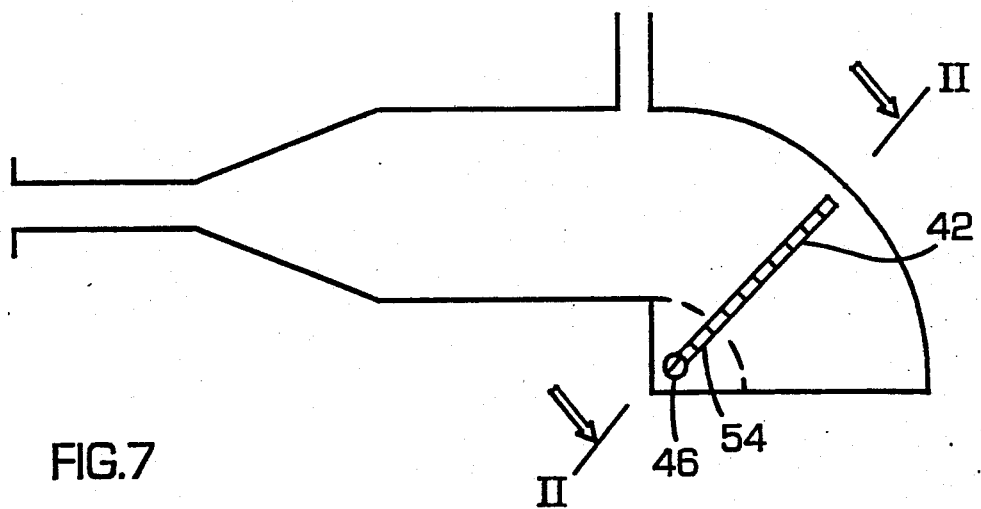
FIG. 7 is a cross-sectional view of yet another exemplary embodiment of the exhaust system of the present invention.

As illustrated in FIG. 7, a rigid connector plate 54 can be used to connect the baffle plate 42 to the rotating shaft 46. Connecting the baffle plate 42 to the rotating shaft 46 with the rigid connector plate 54 increases the radius of rotation of the baffle plate 42.

Figure 8:
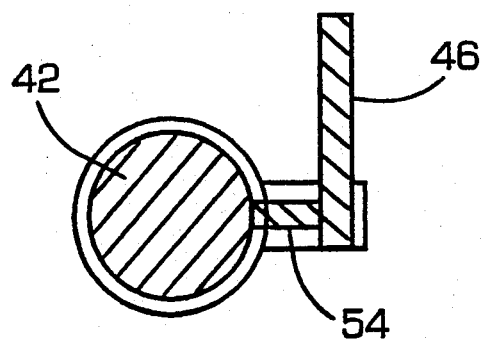
FIG. 8 is a sectional view taken along the line II—II of FIG. 7.

Referring to FIG. 8, a cross-sectional view of the embodiment of FIG. 7, taken along the line II—II, is illustrated.

Figure 9:
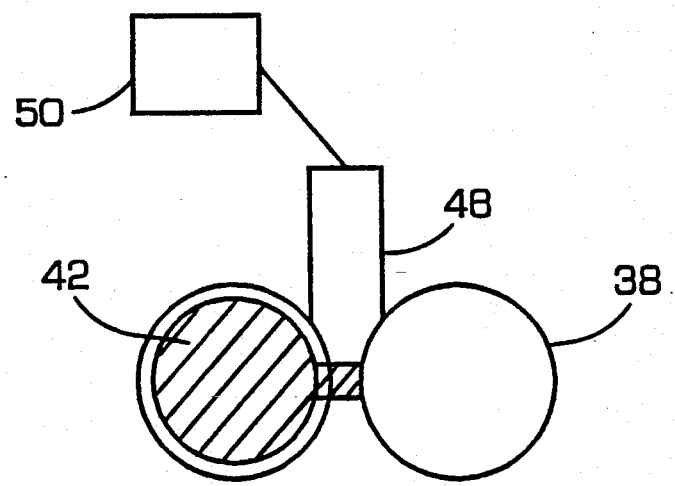
FIG. 9 illustrates one exemplary embodiment of the exhaust system of the present invention.

As illustrated in FIG. 9, in a further embodiment of the present invention, the rotating mechanism 48 is directly connected to the baffle member 42, thus obviating the need for a rotating shaft 46.

Figure 10:
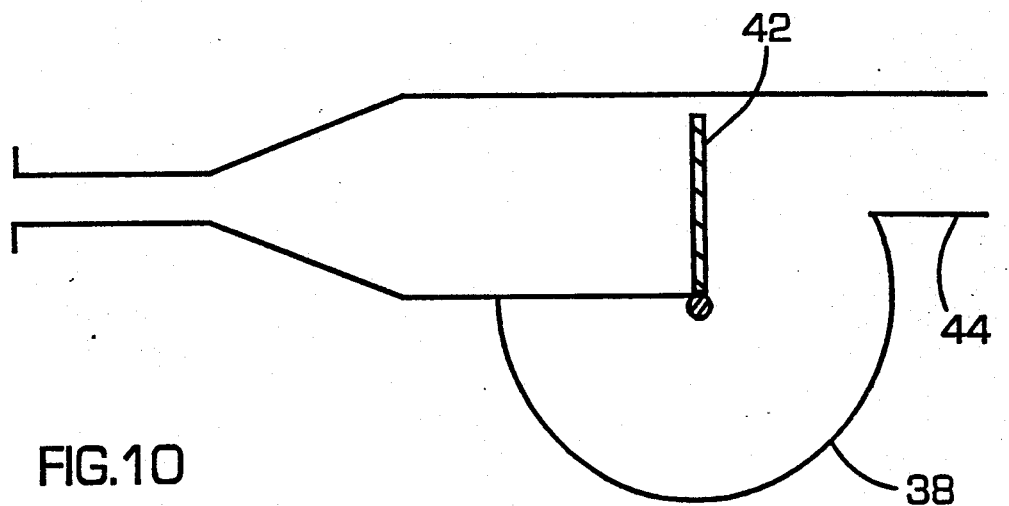
FIG. 10 illustrates another exemplary embodiment of the exhaust system of the present invention.

In another embodiment, as illustrated in FIG. 10, the tail pipe 44 of the exhaust system of the present invention may be positioned such that the tail pipe 44 is positioned downstream of the upstream most position of baffle member 42. In any embodiment, the tail pipe 44 can be positioned anywhere in the exhaust system in which the exhaust may be introduced into the atmosphere.

Figure 11:
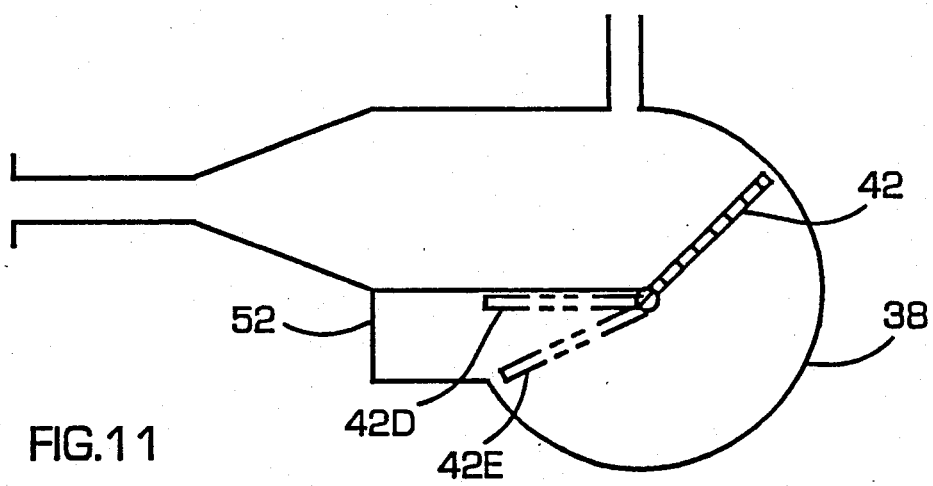
FIG. 11 illustrates yet another exemplary embodiment of the exhaust system of the present invention.

In yet another embodiment, as illustrated in FIG. 11, the baffle chamber includes a section 52 which is open to the main baffle chamber 38. This arrangement extends the volume of the baffle chamber 38 when the baffle member 42 is in position 42d, and closes the chamber 38 when the baffle member 42 rotates to or beyond position 42e. The baffle chamber extension 52 is positioned in the same plane as the main baffle chamber 38, as shown in FIG. 11. However, it is also contemplated that the baffle chamber extension 52 can be positioned perpendicular to the plane of the main baffle chamber 38, or in any other position which would allow for it to be opened and closed by rotation of the baffle member 42.

Figure 12:
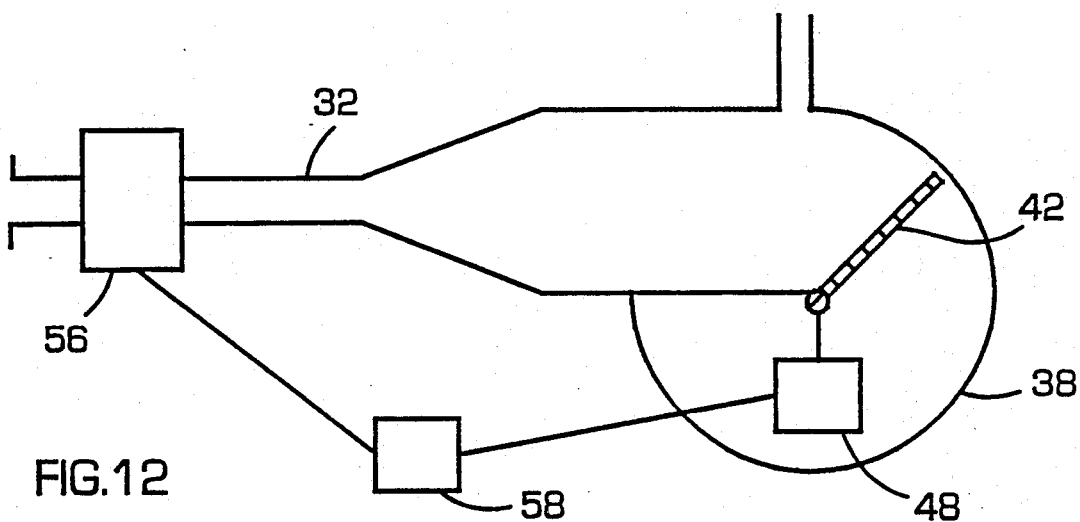
FIG. 12 illustrates a further exemplary embodiment of the exhaust system of the present invention.
Figure 13:
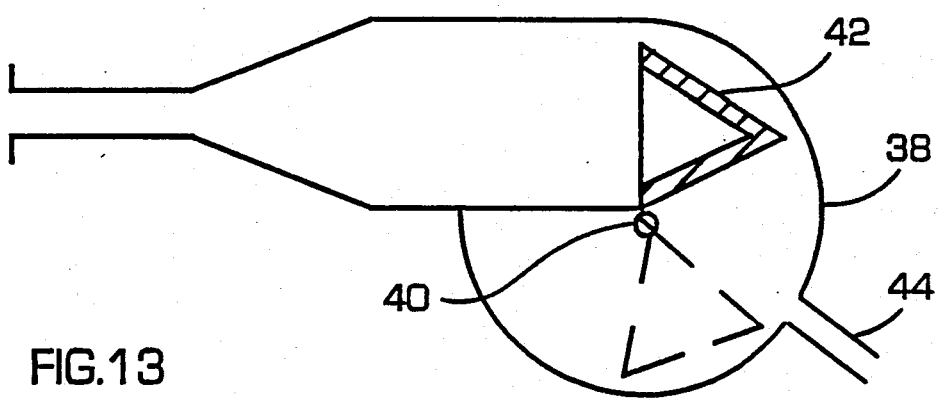
FIG. 13 illustrates an exemplary sectional view showing a baffle member having a generally conical shape.

In a further embodiment, as illustrated in FIG. 12, the rotating mechanism 48 is connected to a central processing unit 58. An exhaust control device 56 can also be connected to the central processing unit 58. The exhaust control device 56 can be located, for example, within the header section 32.

In all embodiments contemplated by the present invention, the baffle member 42 may not completely seal the baffle chamber 38. Thus, either a passage may be provided in the baffle plate 42, or the baffle plate 42 may be distanced sufficiently from the walls of the baffle chamber 38.

In any arrangement, the baffle member 42 may be either flat, curved, V-shaped, or any other shape, such as a sphere, half-sphere or cone, in order to effect the form of the reflected exhaust pulse or the operation of the baffle member 42 within the baffle chamber 38.

The area of the baffle chamber 38 downstream of the baffle member 42 may be made to communicate with the mid-section of the exhaust system by any means, such as a communicating hole or duct between the baffle chamber 38 and the mid-section.

Although other modifications and changes may be suggested by those skilled in the art, it is the intention of the inventor to embody within the patent warranted hereon all changes and modifications as reasonably and properly come within the scope of his contribution to the art.

I claim:

1. An exhaust system for a two-cycle internal combustion engine comprising:
   an exhaust port;
   an exhaust pipe having an upstream end connected to said exhaust port;
   a baffle chamber connected to a downstream portion of said exhaust pipe;
   displaceable baffle member means, swingably mounted on pivot means having a fixed axis of rotation and projecting from said pivot means across said baffle chamber toward a wall defining said baffle chamber, for varying the effective volume of said baffle chamber;
   rotating mechanism means, and means connecting said rotating mechanism means with said displaceable baffle member means, for swingably displacing said displaceable baffle member means in said baffle chamber about said axis of rotation;
   control means, connected to said rotating mechanism means, for driving said rotating mechanism means and thereby rotating said baffle member means throughout a predetermined range of movement; and
   tail pipe means for receiving exhaust from said exhaust pipe and said baffle chamber.

2. An exhaust system according to claim 1, wherein said baffle chamber has a substantially circular cross-section, and wherein said baffle member means has a complementary substantially circular shape.

3. An exhaust system according to claim 1, wherein said baffle chamber has a substantially rectangular cross-section, and wherein said baffle member means has a complementary substantially rectangular shape.

4. An exhaust system according to claim 1, wherein said baffle chamber has a substantially oval cross-section, and wherein said baffle member means has a complementary substantially oval shape.

5. An exhaust system according to claim 1, wherein said baffle member means has a substantially conical shape.

6. An exhaust system according to claim 1, wherein said tail pipe means is downstream of the most upstream position of said baffle member means.

7. An exhaust system according to claim 1, wherein a cross sectional shape for said chamber baffle and complementary shape of said baffle member means are chosen from the group consisting of circular and noncircular.

8. An exhaust system according to claim 1, further comprising an exhaust control device connected to said control means.

9. An exhaust system according to claim 1, further comprising an extension chamber connected to said baffle chamber.

10. An exhaust system according to claim 1, further comprising an extension chamber connected to said baffle chamber so that communication between said extension chamber and said baffle chamber is controlled by said baffle member means.

11. An exhaust system according to claim 1, wherein said chamber and baffle member means have shape chosen from the group consisting of circular and noncircular.

12. An exhaust system for a two-cycle internal combustion engine comprising:
    an exhaust port;
    an exhaust pipe connected to said exhaust port;
    a baffle chamber disposed within said exhaust pipe and defining predetermined interior wall shape;
    baffle member means, disposed in close proximity to said interior wall shape of said baffle chamber, for providing a reflective surface to exhaust pulses within said exhaust pipe;
    rotation transmitting shaft means, connected to said baffle member means and mounted for positioning said baffle member means within said baffle chamber for pivotally rotating said baffle member means about an axis of rotation of said transmitting shaft means;
    rotating mechanism means, connected to said rotation transmitting shaft means, for rotating said rotation transmitting shaft means;
    a control system connected to said rotating mechanism means for determining an angle of rotation of said baffle member means;
    and said baffle member means comprising a non-conical baffle having its edge complementary to said interior wall shape of said baffle chamber.

* * * * *